(12) United States Patent  
Roslund et al.

(10) Patent No.: US 12,658,661 B2  
(45) Date of Patent: Jun. 16, 2026

(54) INTEGRATED END MIRROR ASSEMBLY FOR A FIBER RING LASER

(71) Applicant: Vector Atomic, Inc., Pleasanton, CA (US)

(72) Inventors: Jonathan David Roslund, Pleasanton, CA (US); Arman Cingoz, Pleasanton, CA (US); Abijith Sudarsan Kowligy, Livermore, CA (US)

(73) Assignee: Vector Atomic, Inc., Pleasanton, CA (US)

( * ) Notice: Subject to any disclaimer, the term of this patent is extended or adjusted under 35 U.S.C. 154(b) by 819 days.

(21) Appl. No.: 18/046,427

(22) Filed: Oct. 13, 2022

(65) Prior Publication Data

US 2024/0128704 A1     Apr. 18, 2024

(51) Int. Cl.  
*H01S 3/067* (2006.01)  
*H01S 3/00* (2006.01)

(52) U.S. Cl.  
CPC .......... *H01S 3/06791* (2013.01); *H01S 3/005* (2013.01)

(58) Field of Classification Search  
CPC .. H01S 3/06791; H01S 3/005; H01S 3/08059; H01S 3/08; H01S 3/1067; H01S 3/1118; H01S 3/105; H01S 3/06712; H01S 3/06704; G02B 6/262; G02B 6/2746; G02B 6/32  
See application file for complete search history.

(56) References Cited

U.S. PATENT DOCUMENTS

| | | | | |
|---|---|---|---|---|
| 6,853,488 B1 * | 2/2005 | Cao | ...................... | G02B 6/2746 385/11 |
| 8,170,384 B1 | 5/2012 | Riza | | |
| 9,312,656 B2 * | 4/2016 | Lee | ...................... | G01L 11/025 |
| 2002/0081067 A1 | 6/2002 | Brun et al. | | |
| 2003/0081908 A1 | 5/2003 | Gage et al. | | |
| 2003/0185485 A1 * | 10/2003 | Bennett | .............. | G02B 6/12004 385/14 |
| 2005/0169324 A1 * | 8/2005 | Ilday | ...................... | H01S 3/1115 372/18 |
| 2006/0056464 A1 * | 3/2006 | Chong | .................. | H01S 3/0675 372/6 |
| 2011/0170110 A1 * | 7/2011 | Oigawa | .................. | H01S 5/0608 372/20 |
| 2013/0128906 A1 * | 5/2013 | Honda | ...................... | H01S 3/108 372/28 |

(Continued)

OTHER PUBLICATIONS

Denisov et al., "Femtosecond fibre laser with a hybrid linear-ring cavity", Quantum Electronics, vol. 38, No. 9, Sep. 30, 2008 (Sep. 30, 2008), pp. 801-802. (Year: 2008).*

(Continued)

*Primary Examiner* — Xinning(Tom) Niu  
(74) *Attorney, Agent, or Firm* — Patterson + Sheridan, LLP

(57) ABSTRACT

Embodiments herein describe a path length adjuster for, e.g., adjusting the length of an optical cavity of a laser. In one embodiment, the path length adjuster includes a circulator element for ensuring unidirectional lasing. The path length adjuster may also include one or more focusing elements such as a focusing lens and/or a collimator which directs received laser light at a mirror. The mirror is mounted on an actuator that moves the mirror in a direction parallel with the propagation of the laser light, thereby increasing or reducing the length of the ring cavity.

20 Claims, 4 Drawing Sheets

(56)                References Cited

U.S. PATENT DOCUMENTS

2017/0063025 A1*  3/2017  Wakabayashi ........ H01S 3/1305
2020/0412081 A1*  12/2020  Muendel .............. H01S 3/1118

OTHER PUBLICATIONS

Sinclair, L. C. et al. "A compact optically coherent fiber frequency comb," Review of Scientific Instruments 86, 081301 (2015).

Polynkin, A., Polynkin, P., Mansuripur, M. & Peyghambarian, N. "Single-frequency fiber ring laser with 1W output power at 1.5μm," Opt. Express, OE 13, 3179-3184 (2005).

Zhu, Z. et al. "Tunable optical frequency comb from a compact and robust Er:fiber laser," High Power Laser Science and Engineering 8, (2020).

Briles, T. C., Yost, D. C., Cingöz, A., Ye, J. & Schibli, T. R. Simple piezoelectric-actuated mirror with 180 KHz servo bandwidth. Opt. Express 18, 9739-9746 (2010).

Nakamura, T. et al. Piezo-electric transducer actuated mirror with a servo bandwidth beyond 500 kHz. Opt. Express, OE 28, 16118-16125 (2020).

European Patent Office, Partial European Search Report for European Patent Application No. 23197352.0, dated Mar. 1, 2024.

Denisov et al., "Femtosecond fibre laser with a hybrid linear-ring cavity", Quantum Electronics, vol. 38, No. 9, Sep. 30, 2008 (Sep. 30, 2008), pp. 801-802, XP093044946.

Buks Eyal et al: "Mode locking in an optomechanical cavity", EPL (Europhysics Letters), vol. 129, No. 2, Feb. 5, 2020 (Feb. 5, 2020), p. 24005, XP93132669.

Numata K et al: "Experimental performance of a Single-mode ytterbiumdoped fiber ring laser with intracavity modulator", Laser Physics Letters, vol. 9, No. 8, Jul. 16, 2012 (Jul. 16, 2012), pp. 575-580, XP93132514.

European Patent Office, Extended European Search for European Patent Application No. 23197352.0 dated Jun. 19, 2024.

Choi Eunseo et al: "All-fiber variable optical delay line for applications in optical coherence tomography: feasibility study for a novel delay line", Optics Express, vol. 13, No. 4, Feb. 21, 2005 (Feb. 21, 2005), p. 1334.

Ozolinsh Maris et al: 11 2.79 [mu]m erbium laser with lead-lanthanum zirconate titanate ceramics electro-optic Q-switching output coupler, Applied Physics Letters, American Institute of Physics, 2 Huntington Quadrangle, Melville, NY 11747, vol. 77, No. 5, Jul. 31, 2000 (Jul. 31, 2000), pp. 615-617.

* cited by examiner

RING CAVITY FIBER LASER *100*

CAVITY ADJUSTOR *105*

*110*
ACTUATOR

*115*
MIRROR

*120*
CIRCULATOR ELEMENT

INPUT PORT

OUTPUT PORT

OPTICAL FIBER *125*

*135* GAIN FIBER

FIBER STRETCHER *130*

*140* WDM

LASER OUT

PUMP IN

INTEGRATED END MIRROR ASSEMBLY FOR A FIBER RING LASER

STATEMENT OF GOVERNMENT INTEREST

This invention was made with government support under Contract No: 140D04-20-D-0001 awarded by the Defense Advanced Research Project Agency. The government has certain rights in the invention.

BACKGROUND

Field

Embodiments of the present invention generally relate to an end mirror assembly with a spatially adjustable mirror for a fiber ring laser.

Description of the Related Art

Laser systems based on fiber-optics form the backbone of the telecommunication industry due to their robustness and availability of bonded, integrated components that can be fusion spliced onto fibers to provide a variety of functionalities, such as mirrors, filters, isolators, and optical circulators. One disadvantage of fiber-based lasers is their sensitivity to vibrations and acoustics that stem from three problems: (1) imperfections in fiber splices that can lead to spurious intra-cavity back reflections; (2) temperature and pressure fluctuations as well as mechanical vibrations that cause the fiber length to change; and (3) a lack of high-speed actuators that can control the cavity length at high frequencies (>10 kHz).

The typical solution to the first problem is to build a ring laser with an intra-cavity isolator that enforces unidirectional lasing. However, this makes it difficult to incorporate a high-speed actuator. These lasers typically incorporate fiber stretchers that are strain-based and thus low bandwidth and of limited dynamic range. High-speed PZT actuators can be incorporated behind a cavity end mirror in linear laser cavities, which provide a free-space length displacement. However, this architecture suffers from spurious intra-cavity back reflections and spatial hole burning.

SUMMARY

One embodiment described herein is a cavity adjuster for a laser having a ring cavity. The cavity adjuster includes an input port configured to receive laser light, an output port configured to transmit the laser light, a circulator element optically coupled to the input and output ports and is configured to establish unidirectional lasing such that the laser light can propagate in the ring cavity in only one direction, a mirror configured to receive the laser light in free-space from the circulator element and reflect the laser light such that the reflected laser light passes through the circulator element and into the output port, and an actuator physically coupled to the mirror where the actuator adjusts a relative distance between the mirror and the circulator element to change a length of the ring cavity.

Another embodiment described herein is an optical path length adjuster that includes an input port configured to receive laser light, an output port configured to transmit the laser light, a circulator element optically coupled to the input and output ports and is configured to establish unidirectional propagation of the laser light from the input port to the output port, a mirror configured to receive the laser light in free-space from the circulator element and reflect the laser light such that the reflected laser light passes through the circulator element and into the output port, and an actuator physically coupled to the mirror where the actuator adjusts a relative distance between the mirror and the circulator element.

Another embodiment described herein is an optical path length adjuster that includes an input port configured to receive laser light, an output port configured to transmit the laser light, a circulator element optically coupled to the input and output ports and is configured to establish unidirectional propagation of the laser light from the input port to the output port, a mirror configured to receive the laser light from the circulator element and reflect the laser light such that the reflected laser light passes through the circulator element and into the output port, and an actuator physically coupled to the mirror where the actuator adjusts a relative distance between the mirror and the circulator element.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein describe a cavity adjuster for adjusting the length of a ring cavity of a fiber ring laser. In one embodiment, the cavity adjuster includes a circulator element for ensuring light can be received only at an input port and can exit only at an output port (i.e., unidirectional lasing). The cavity adjuster also includes one or more focusing elements such as a focusing lens and/or a collimator which directs received light at a mirror. The mirror is mounted on an actuator that moves the mirror in a direction parallel with the propagation of the light, thereby increasing or reducing the length of the ring cavity.

Figure 1:
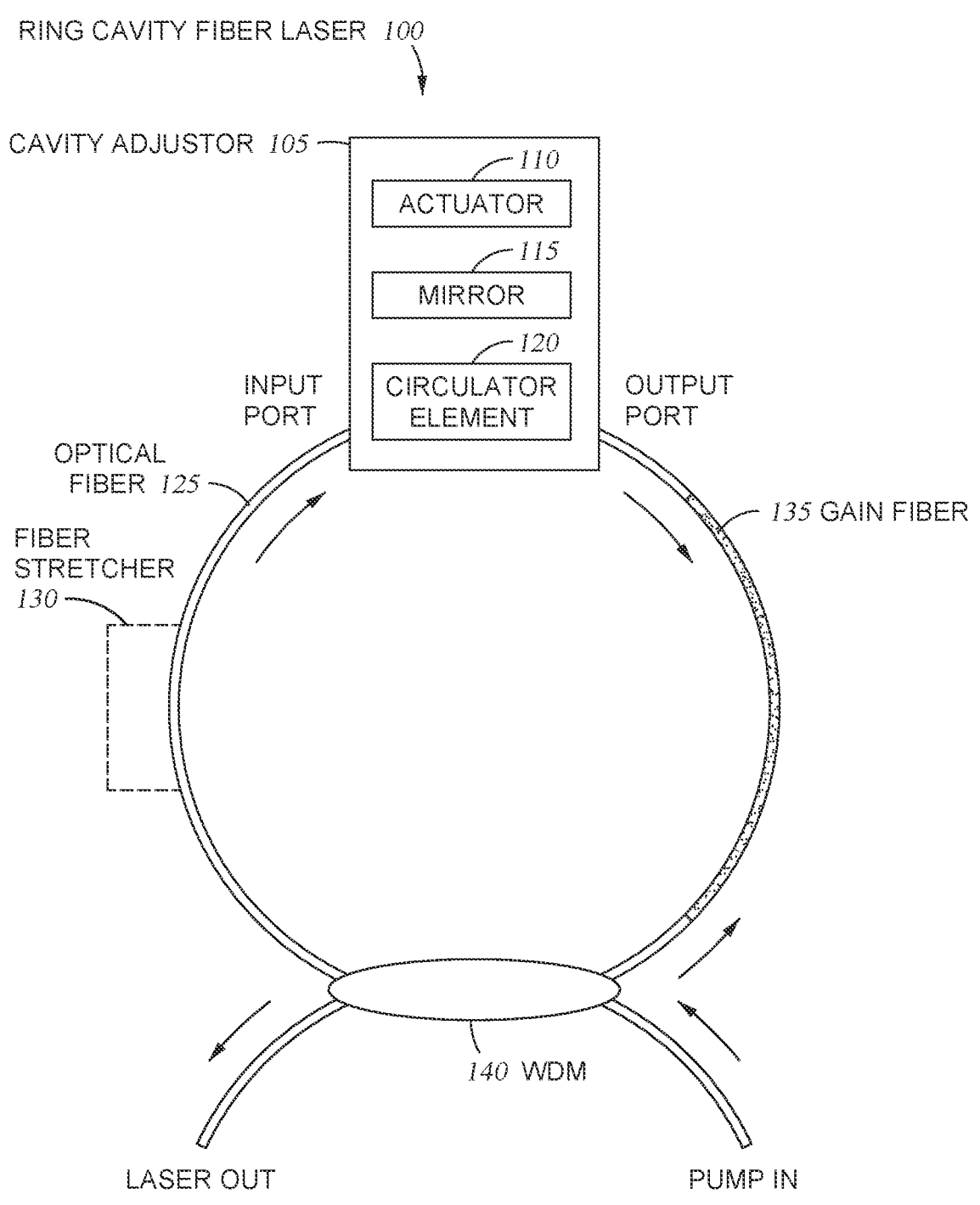
FIG. 1 illustrates a ring cavity fiber laser, according to one embodiment.

FIG. 1 illustrates a ring cavity fiber laser 100, according to one embodiment. The laser 100 receives an optical signal (e.g., light) from a pump source (not shown) at a pump port which is coupled to a wavelength division multiplexer (WDM) 140. The light received from the pump at the WDM 140 is transmitted in the counterclockwise direction towards a gain fiber 135. As a non-limiting example, the optical signal provided by the pump may be a 980 nm optical signal which causes the gain fiber 135 to fluoresce and generate a 1560 nm optical signal. Any of the pump optical signal (980 nm) that was not absorbed by the gain fiber 135, and any of the optical signal generated by the gain fiber 135 (1560 nm light) that travels in the counterclockwise direction is dispersed by a circulator element 120 in a cavity adjustor 105, which is discussed in more detail blow. That is, the circulator element 120 does not permit optical signals to traverse the ring cavity fiber laser 100 in the counterclockwise direction. However, the light generated by the gain fiber 135 that travels in the clockwise direction passes through the WDM 140 and enters the optical fiber 125 and the cavity adjustor 105.

The ring cavity fiber laser 100 includes a ring cavity formed by an optical fiber 125, the cavity adjuster 105, gain fiber 135, and the WDM 140. In this embodiment, only the light propagating in the clockwise direction can pass through the cavity adjuster 105, however, it is equally feasible to configure the laser 100 such that only the light traveling in the counterclockwise direction passes through the cavity adjuster 105. In any case, after traveling around the ring cavity, the WDM 140 permits at least a portion of the light to exit the laser 100 at a laser output.

In one embodiment, the optical fiber 125 is different from the gain fiber 135. For example, the optical fiber 125 may be an undoped or non-gain fiber while the gain fiber 135 can be a doped optical fiber. The gain fiber 135 is used to amplify the light traveling in the ring cavity. In one embodiment, the gain fiber 135 is fused or spliced to the optical fiber 125. That is, each end of the gain fiber 135 can be fused to respective optical fibers 125. As shown, one piece of optical fiber 125 optically couples the WDM 140 to the cavity adjuster 105 via an input port, a second piece of optical fiber 125 optically couples the cavity adjuster 105 via an output port to a first end of the gain fiber 135, and a third piece of optical fiber 125 optically couples a second end of the gain fiber 135 to the WDM 140. However, this is just one example, and other implementations may use more or fewer pieces of optical fiber 125.

The cavity adjuster 105 adjusts the length of the ring cavity. That is, the cavity adjuster 105 changes the distance the light travels as it propagates in the ring. As shown, the cavity adjuster 105 includes an actuator 110, a mirror 115, and a circulator element 120. The light enters the cavity adjuster 105 at the input port, passes through circulator element 120, and is reflected by the mirror 115, passes through the circulator element 120 a second time and exits at the output port. The different arrangements of the cavity adjuster 105 are discussed in the figures that follow.

In one embodiment, the mirror 115 is disposed on the actuator 110 where the actuator 110 moves the mirror 115 in a direction that is parallel with the direction of the light propagation. Thus, the actuator 110 can move the mirror 115 in a first direction to cause the light to travel farther before reaching the mirror 115, or move the mirror 115 in a second, opposite direction to reduce the distance the light travels before reaching the mirror 115. Thus, moving the mirror 115 in the first direction increases the length of the ring cavity while moving the mirror 115 in the second direction shrinks the length of the ring cavity.

The circulator element 120 permits unidirectional lasing where light can pass through the cavity adjuster 105 only if it enters from input port and exits the cavity adjuster 105 through the output port. Thus, any light received on the output port is scattered or attenuated so light does not propagate in the counterclockwise direction around the ring cavity. Further, when the light is reflected from the mirror 115, the circulator element 120 prevents that light from exiting on the input port. Unidirectional lasing makes the ring laser less susceptible to vibrations and acoustics.

In addition to using the cavity adjuster 105 to change the length of the ring cavity, the laser 100 can include an optional fiber stretcher 130 (illustrated using dashed lines) that physically stretches the optical fiber 125 to increase the length of the ring cavity. That is, both the cavity adjuster 105 and the fiber stretcher 130 can be used to control the length of the ring cavity. While the fiber stretcher 130 uses a strain-based technique that is low bandwidth and limited dynamic range, in contrast the actuator 110 can be a high-speed piezoelectric (PZT) actuator which uses free-space length displacement to move the mirror 115. In one embodiment, the actuator 110 can be used to make fast, small adjustments to the length of the ring cavity while the fiber stretcher 130 is used to make slow but larger adjustments to the length of the ring cavity.

Further, using a ring cavity with the cavity adjuster 105 avoids spurious intra-cavity back reflections and spatial hole burning from using linear laser cavities where actuators are used to adjust a mirror at a cavity end.

Moreover, the cavity adjuster 105 can be used in other devices besides the ring cavity fiber laser 100. For example, the cavity adjuster 105 can be used in a phase modulator or phase actuator in a fiber interferometer to adjust the phase of an optical signal. As such, the cavity adjustor 105 can be more generically referred to as an optical path length adjuster which can be used in a ring laser, phase modulator, phase actuator, and the like.

Figure 2A:
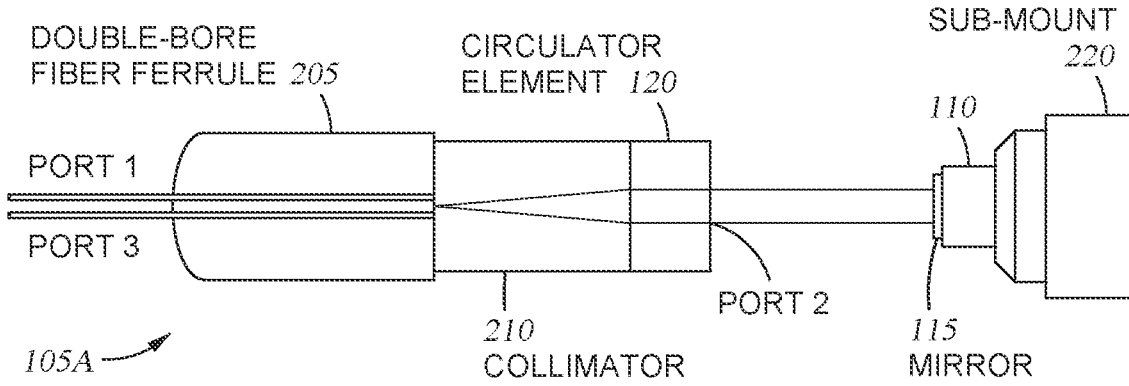
FIGS. 2A-2C illustrate cavity adjusters for a ring cavity fiber laser, according to one embodiment.
Figure 2B:
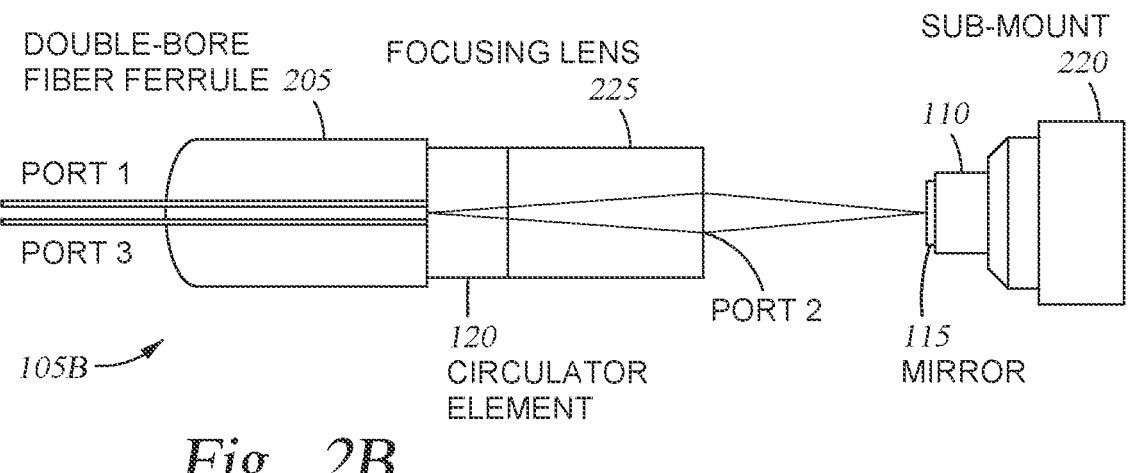
Figure 2C:
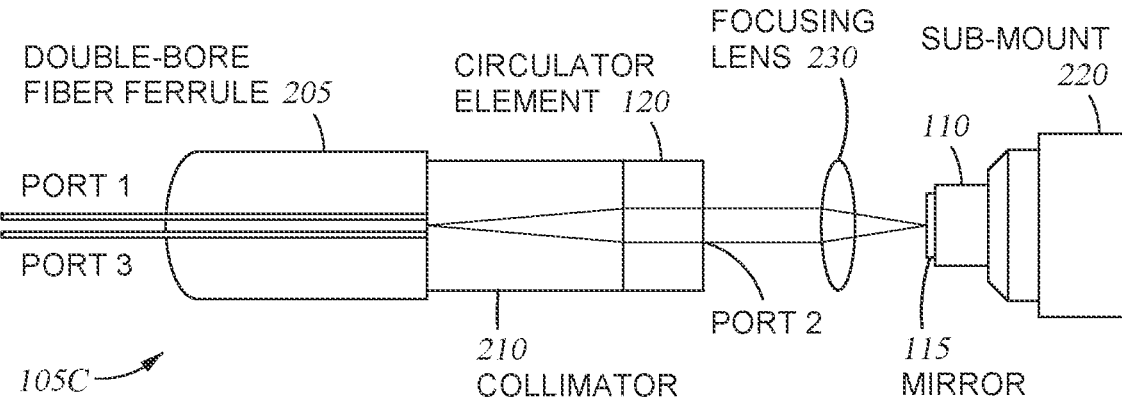

FIGS. 2A-2C illustrate cavity adjusters 105 for a ring cavity fiber laser, according to one embodiment. FIG. 2A illustrates a cavity adjuster 105A that includes a double-bore fiber ferrule that receives optical fibers at Ports 1 and 3. As discussed above, optical signals are received at Port 1 and exit the cavity adjuster 105A at Port 3.

A collimator 210 contacts the ferrule 205 to receive the optical signal from Port 1. The collimator 210 then collimates the light and transmits the light to a circulator element 120, which is one example of the circulator element 120 described in FIG. 1. For example, if any light is received on Port 3, the circulator element 120 will scatter or attenuate that light such that any spurious reflection from the mirror 115 will not be coupled back into Port 1.

As shown, the cavity adjuster 105A uses a free-space optical path to communicate the light between the circulator element 120 and the mirror 115. That is, the cavity adjuster 105A includes Port 2 of the circulator element 120 which is a free-space optical port. Using a free-space optical port eliminates any fiber over which light might propagate in both directions, which is one of the main sources of vibration sensitivity for fiber lasers. The mirror 115 then reflects the light back to Port 2 of the circulator element 120 (e.g., retro-reflection). That is, the mirror 115 has a reflective surface that is perpendicular to the direction of propagation of the light.

The circulator element 120 receives the light reflected by the mirror 115 and ensures this light passes through the collimator 210 and into the Port 3. That is, the circulator element 120 ensures that substantially none of the light reflected by the mirror 115 exits the cavity adjuster at Port 1, but instead exits at Port 3, thereby establishing unidirectional lasing in the ring cavity.

The cavity adjuster 105A adjusts the length of the ring cavity using the actuator 110 (e.g., a PZT). In this example, the mirror 115 is mounted on the actuator 110 which is in turn mounted on a sub-mount 220. The spatial location of the sub-mount 220 remains fixed, however, the width of the actuator 110 can change thereby moving the mirror 115 closer to the sub-mount 220 (and farther from the circulator element 120) or farther from the sub-mount 220 (and closer to the circulator element 120). Moving the mirror 115 closer to the sub-mount 220 increases the length of the ring cavity while moving the mirror closer to the circulator element 120 reduces the length of the ring cavity. Thus, in this example, the actuator 110 changes the location of the mirror 115 relative to the other components in the cavity adjuster 105A in order to increase or decrease the length of the ring cavity. This allows for the fine adjustment of the cavity length by displacement of the mirror 115 from the circulator element 120 and the collimator 210 without altering the back coupling as long as the distance is less than the Rayleigh range of the collimated beam diameter.

In one embodiment, a PZT actuator 110 has an actuation bandwidth that is ten times better than fiber stretchers with similar throw. This is because the contraction and elongation of the PZT freely moves the mirror 115 along the cavity length. In fiber stretchers, the PZT stretches the glass fiber itself. This leads to a variety of problems in assembly that the cavity adjuster 105 avoids, such as how the fiber is tensioned when it is glued to the PZT, slippage between an acrylate coating and the glass fiber itself, or handling of bare, uncoated fiber. However, as discussed above, the cavity adjuster 105 can be used in tandem with a fiber stretcher.

While FIG. 2A illustrates directly contacting the ferrule 205 to the collimator 210 and the collimator 210 to the circulator element 120, the cavity adjuster 105A may use free-space optical paths between these components. Further, in another embodiment, the locations of the circulator element 120 and the collimator 210 may be swapped such that the circulator element 120 is between the ferrule 205 and the collimator 210.

However, the performance of the cavity adjuster 105A may degrade in the presence of vibrations since any angular misalignment of the mirror 115 leads to changes in the focal point of the retro-reflected beam, which alters the coupling back into optical fiber at Port 3. In addition, the cavity adjuster 105A may not be suitable for applications where the spot size on the mirror 115 is an important parameter, such as semiconductor saturable-absorber mirror (SESAM) mode-locked lasers where the beam is typically tightly focused on the SESAM (e.g., the mirror 115).

FIG. 2B illustrates a cavity adjuster 105B that addresses the vibration sensitivity and small spot size on the mirror 115 issues with the cavity adjuster 105A in FIG. 2A. Instead of a collimator 210, the cavity adjuster 105B includes a focusing lens 225 disposed between the circulator element 120 and the mirror 115. That is, the collimator can be omitted from the cavity adjuster 105B.

The focal length of the lens 225 is chosen to focus the light at a specific distance. The mirror 115 is placed at the focal plane of the lens 225. This "cat's eye" retroreflection geometry is more immune to vibrations since any angular misalignment of the mirror 115 at the focal plane does not significantly alter the position of the retro-reflected beam at the surface of Port 3. The actuator 110 can operate as discussed above to adjust the displacement of the mirror 115 to change the length of the ring cavity.

While FIG. 2B illustrates directly contacting the ferrule 205 to the circulator element 120 and the circulator element 120 to the focusing lens 225, the cavity adjuster 105B may use free-space optical paths between these components. Further, in another embodiment, the locations of the circulator element 120 and the focusing lens 225 may be swapped such that the focusing lens 225 is between the ferrule 205 and the circulator element 120. This arrangement assumes the circulator element 120 is shorter than the focal length of the focusing lens 225 so that there is room for placing the mirror 115 on the focal plane However, there are some disadvantages with the cavity adjuster 105B. The magnification factor of the imaging system is fixed. This is limited by the length and the clear aperture of the circulator element 120 and set when the circulator element 120 is manufactured or constructed. Also, the free-space optical path between the focusing lens 225 and the mirror 115 is not tunable for fine cavity length adjustments since it is set by the focal length of the focusing lens 225.

FIG. 2C illustrates a cavity adjuster 105C that addresses the disadvantages of the cavity adjusters 105A and 105B. Like FIG. 2A, the cavity adjuster 105C includes the collimator 210 disposed between the ferrule 205 and the circulator element 120. After the collimated light passes through the circulator element 120, a focusing lens 230 (e.g., a cat's eye retroreflector), focuses the light onto the mirror 115. In one embodiment, the locations of the circulator element 120 and the collimator 210 can be swapped, assuming the lengths are set so that the optical signal has not diverged beyond the size of the collimator 210 after exiting the circulator element 120.

The advantages of the design of the cavity adjuster 105C are: (1) the focused spot size at the mirror 115 can be modified or optimized by use of different focal length focusing optics (as a result, the same collimator 210 can be used in a variety of laser designs); (2) the distance between the circulator element 120 and the focusing lens 230 is adjustable when assembling the adjuster 105C, which allows for fine tuning of the laser cavity length during the build of the adjuster 105C; (3) it retains the vibration sensitivity improvements since any angular misalignment of the mirror 115 is at the focal plane of the mirror 115 and does not significantly alter the position of the retro-reflected beam.

Figure 3:
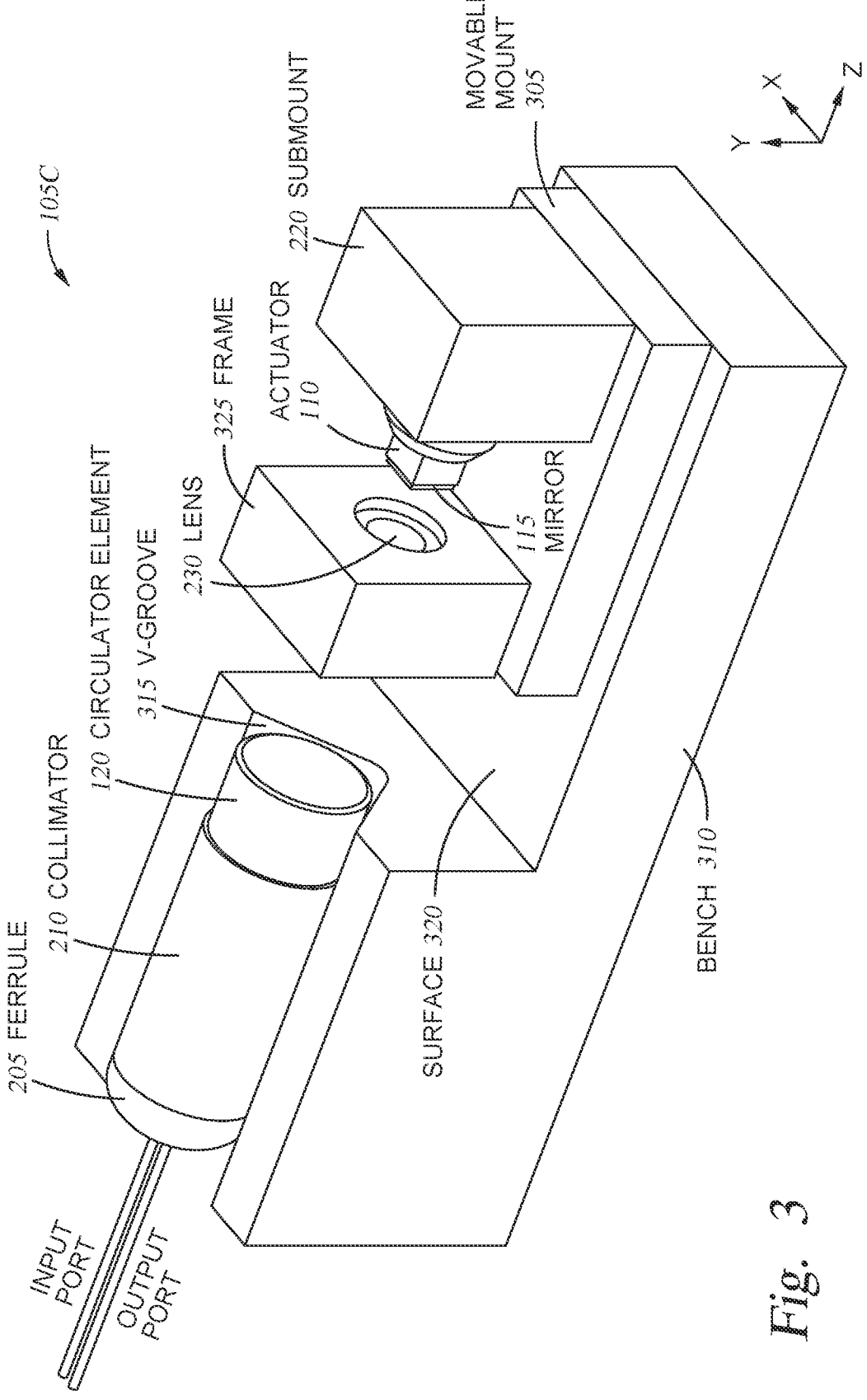
FIG. 3 illustrates a plan view of a cavity adjuster for a ring cavity fiber laser, according to one embodiment.

FIG. 3 illustrates a plan view of the cavity adjuster 105C shown in FIG. 2C, according to one embodiment. FIG. 3 illustrates two optical fibers corresponding to input and output ports entering the ferrule 205. The light received on the fiber for the input port is then received and collimated by the collimator 210.

The collimated light passes through the circulator element 120 and is transmitted to the focusing lens 230 in free-space, which in turn focuses the light onto the mirror 115. The reflected light then reverses its path and exits on the fiber for the output port.

FIG. 3 illustrates a bench 310 that provides support for the various components in the cavity adjuster 105C. As shown, the bench 310 includes a V-groove 315 in which the ferrule 205, collimator 210, and circulator element 120 are disposed in order to passively align these components with the focusing lens 230. Further, the bench 310 includes a surface 320 that is lower than the V-groove 315 which supports a frame 325 of the focusing lens 230, the mirror 115, the actuator 110, and the sub-mount 220.

In this embodiment, the focusing lens 230, the mirror 115, the actuator 110, and the sub-mount 220 are disposed on a moveable mount 305 which is in turn disposed on the surface 320. The distance between the V-groove 315 and the surface 320 can be set so that when the moveable mount 305 is set on the surface, the focusing lens 230, the mirror 115, the actuator 110, and the sub-mount 220 are aligned with the ferrule 205, collimator 210, and circulator element 120 in the Y direction. Although not shown, the surface 320 may include alignment guides (e.g., side walls) that set displacement of the moveable mount 305 in the X direction, thereby aligning the optical components on the moveable mount 305 with the optical components in the V-groove 315 in both the X and Y directions.

In this example, the movable mount 305 can slide in the Z direction on the surface 320. This permits, during assembly, a technician to move the optical components on the moveable mount 305 closer or further from the circulator element 120. As mentioned above, this results in the distance between the circulator element 120 and the focusing lens 230 being adjustable when assembling the adjuster 105C, which allows for fine tuning of the laser cavity length. When the desired distance in the Z direction is obtained, an epoxy can be used to fixedly attach the moveable mount 305 to the surface 320. Thus, during operation, the relative spatial locations of all the components in the cavity adjuster 105C remain fixed except for the mirror 115 which can be moved in the Z direction by the actuator 110 (e.g., +/− one or two microns) as discussed above.

In one embodiment, FIG. 3 illustrates a cavity adjuster 105C for a SESAM mode-locked ring oscillator, which can be used in, e.g., an optical frequency comb. The frame 325 of the focusing lens 230 may be a metal or aluminum nitride (AlN) mount. The bench 310 and the moveable mount 305 may be made of metal, ceramic, AlN, or another material that does not warp in response to temperature fluctuations.

In one embodiment, the collimated beam transmitted by the circulator element 120 is approximately 300-1000 microns in diameter, which is focused down to approximately to a 5-10 micron spot size using a 1-3 mm focal length anti-reflection coated aspherical lens 230.

The optical design of the bench allows for use of a 1 mm$^2$ mirror 115 and actuator 110, which extends the mechanical resonance frequencies of the mirror 115 and actuator 110 subassembly to greater than 500 kHz. However, the mechanical resonances of the sub-mount 220 are also important. In one embodiment, the sub-mount 220 is a copper mount with a tapered-cylindrical pedestal for the actuator 110. Matching the diameter of the tapered cylinder to that of the actuator 110 increases the frequency of the lowest transverse "drum-head" mode on the surface of the copper to similar frequencies as the mirror 115 and actuator 110 subassembly. However, the sub-mount 220 can be made of other materials besides copper such as lead filled copper or Aluminum Iron (AlFe), which can have improved damping of the mount mechanical resonances to improve performance.

Figure 4:
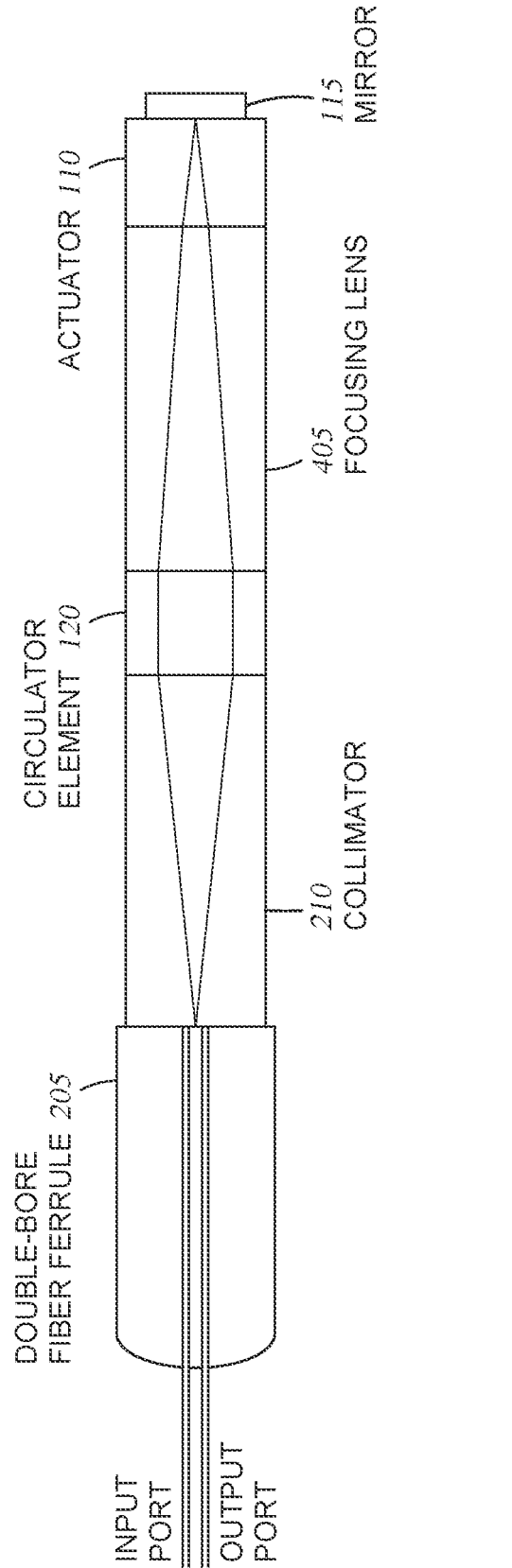
FIG. 4 illustrates a cavity adjuster for a ring cavity fiber laser, according to one embodiment.

FIG. 4 illustrates a cavity adjuster 105D for a ring cavity fiber laser, according to one embodiment. Unlike the cavity adjusters 105A-C, the cavity adjuster 105D does not use a free-space optical path to transfer the light from a focusing element to the mirror 115. The cavity adjuster 105D has a similar structure as FIG. 2A where the collimator 210 is disposed between the ferrule 205 and the circulator element 120. However, the cavity adjuster 105D also includes a focusing lens 405 which, on one end is coupled to the circulator element 120 and on a second end is coupled to the actuator 110.

In this example, the actuator 110 is transparent (or has a hole drilled through it) so that the light focused by the focusing lens 405 can pass through the actuator 110 and reach the mirror 115. The mirror 115 then has a reflective surface disposed on its left side (e.g., the same side that physically couples the mirror 115 to the actuator 110) which then reflects the light back towards the focusing lens 405.

The cavity adjuster 105D functions similar to the previous embodiments, where changing the width of the actuator 110 moves the mirror 115 to the left or right, thereby lengthening or shortening the length of the ring cavity. However, this embodiment avoids having free space optical connections. This may make it easier to align the components (since they can be assembled as a monolithic or unitary component) but it also loses the advantage of having a separate focusing lens like the cavity adjuster 105C in FIG. 2C and thus does not allow for fine-tuning the cavity length during laser build.

There are other alternative arrangements of the cavity adjuster 105D than the one shown in FIG. 4. For example, the positions of the collimator 210 and the circulator element 120 can be swapped. In yet another embodiment, the collimator 210 may be omitted (similar to FIG. 2B) where the circulator element 120 directly contacts the ferrule 205. In yet another embodiment, the focusing lens 405 may be omitted (although this may make the cavity adjuster more susceptible to vibrations like the cavity adjuster 105A in FIG. 2A since collimated light is reflected by the mirror 115).

As shown in FIG. 4, the ferrule 205, the collimator 210, the circulator element 120, the focusing lens 225, the actuator 110, and the mirror 115 can be formed as a monolithic or unitary component. Thus, unlike in FIGS. 2A-3, the optical signal can pass from the input port to the output port without using any free-space optical paths.

Notably, the cavity adjusters 105 discussed above are compatible with both polarization-dependent and independent telecommunication circulator designs. However, the addition of a fast axis blocking polarizer greatly simplifies the circulator design since several birefringent beam displacement crystals that are used to separate the two possible input polarization states can be omitted. Moreover, the fast axis blocking polarizer can be added in the same monolithic or unitary component with the ferrule, collimator and circulator element (as well as other components).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A cavity adjuster for a laser having a ring cavity, comprising:
   an input port configured to receive laser light;
   an output port configured to transmit the laser light;
   a circulator element optically coupled to the input and output ports and is configured to establish unidirectional lasing such that the laser light can propagate in the ring cavity in only one direction;
   a mirror configured to receive the laser light in free-space from the circulator element and reflect the laser light such that the reflected laser light passes through the circulator element and into the output port, wherein there is no optical fiber between the circulator element and the mirror; and an actuator physically coupled to the mirror, wherein the actuator adjusts a relative distance between the mirror and the circulator element to change a length of the ring cavity.

2. The cavity adjuster of claim 1 further comprising:

a focusing lens disposed between the circulator element and the mirror, wherein the laser light travels in free space when propagating between the focusing lens and the mirror.

3. The cavity adjuster of claim 2, wherein the laser light travels, at least partially, in free space when propagating between the focusing lens and the circulator element.

4. The cavity adjuster of claim 3, further comprising:

a collimator configured to collimate the laser light, wherein the collimator is disposed between the focusing lens and the input and output ports.

5. The cavity adjuster of claim 2, wherein the focusing lens directly contacts the circulator element such that the laser light does not travel in free space between the circulator element and the focusing lens.

6. The cavity adjuster of claim 1, further comprising:

a collimator disposed between the mirror and the input and output ports and is configured to collimate the laser light, wherein the laser light is collimated when reaching the mirror.

7. The cavity adjuster of claim 1, further comprising:

a ferrule, wherein optical fibers corresponding to the input and output ports are coupled to the ferrule; and at least one of a collimator or a focusing lens, wherein the ferrule, the circulator element, and the at least one of collimator or focusing lens form a monolithic component that is separate from the actuator and the mirror.

8. An optical path length adjuster, comprising:

an input port configured to receive laser light;

an output port configured to transmit the laser light;

a circulator element optically coupled to the input and output ports and is configured to establish unidirectional propagation of the laser light from the input port to the output port;

a mirror configured to receive the laser light in free-space from the circulator element and reflect the laser light such that the reflected laser light passes through the circulator element and into the output port, wherein there is no optical fiber between the circulator element and the mirror; and an actuator physically coupled to the mirror, wherein the actuator adjusts a relative distance between the mirror and the circulator element.

9. The optical path length adjuster of claim 8, further comprising:

a focusing lens disposed between the circulator element and the mirror, wherein the laser light travels in free space when propagating between the focusing lens and the mirror.

10. The optical path length adjuster of claim 9, wherein the laser light travels, at least partially, in free space when propagating between the focusing lens and the circulator element.

11. The optical path length adjuster of claim 10, further comprising:

a collimator configured to collimate the laser light, wherein the collimator is disposed between the focusing lens and the input and output ports.

12. The optical path length adjuster of claim 9, wherein the focusing lens directly contacts the circulator element such that the laser light does not travel in free space between the circulator element and the focusing lens.

13. The optical path length adjuster of claim 8, further comprising:

a collimator disposed between the mirror and the input and output ports and is configured to collimate the laser light, wherein the laser light is collimated when reaching the mirror.

14. The optical path length adjuster of claim 8, further comprising:

a ferrule, wherein optical fibers corresponding to the input and output ports are coupled to the ferrule; and at least one of a collimator or a focusing lens, wherein the ferrule, the circulator element, and at least one of a collimator or focusing lens form a monolithic component that is separate from the actuator and the mirror.

15. An optical path length adjuster, comprising:

an input port configured to receive laser light;

an output port configured to transmit the laser light;

a circulator element optically coupled to the input and output ports and is configured to establish unidirectional propagation of the laser light from the input port to the output port;

a mirror configured to receive the laser light from the circulator element and reflect the laser light such that the reflected laser light passes through the circulator element and into the output port, wherein there is no optical fiber between the circulator element and the mirror; and an actuator physically coupled to the mirror, wherein the actuator adjusts a relative distance between the mirror and the circulator element.

16. The optical path length adjuster of claim 15, wherein the actuator is disposed between the mirror and the circulator element such that the laser light passes through the actuator before reaching the mirror.

17. The optical path length adjuster of claim 16, wherein the actuator is at least one of: transparent to the laser light or defines an aperture through which the laser light passes to reach the mirror.

18. The optical path length adjuster of claim 15, further comprising:

a focusing element disposed between the input and output ports and the actuator, and wherein the laser light does not pass through free space when being transmitted from the input port to the output port.

19. The optical path length adjuster of claim 18, further comprising:

a collimator disposed between the input and output ports and the circulator element.

20. The optical path length adjuster of claim 19, further comprising:

a ferrule, wherein optical fibers corresponding to the input and output ports are coupled to the ferrule, wherein the ferrule, the collimator, the circulator element, the focusing element, the actuator, and the mirror form a monolithic component.

* * * * *